Figure 1:
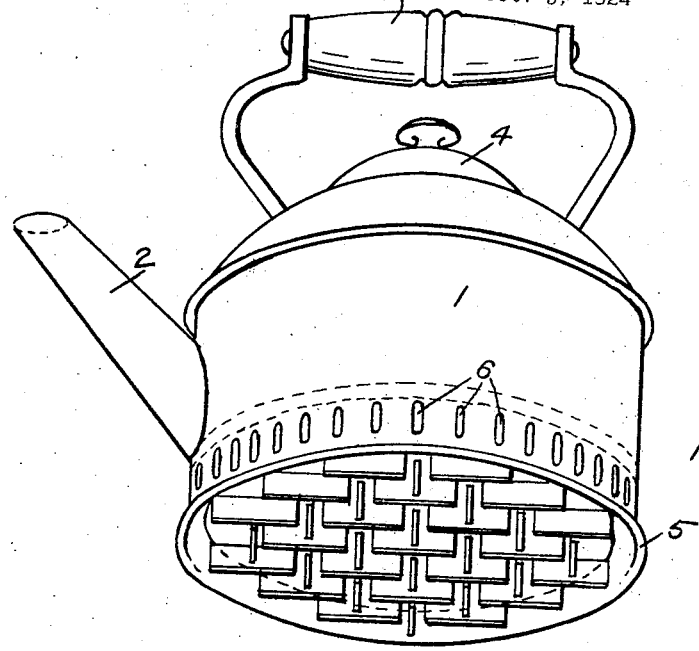

March 30, 1926.

S. W. LACK ET AL 1,578,741

VESSEL FOR HEATING LIQUIDS

Filed Oct. 3, 1924     2 Sheets-Sheet 1

Inventors
S. W. Lack
A. J. Shepherd
By Marks Clerk

March 30, 1926.

S. W. LACK ET AL 1,578,741

VESSEL FOR HEATING LIQUIDS

Filed Oct. 3, 1924   2 Sheets-Sheet 2

Inventors
S. W. Lack
A. J. Shepherd
By Marks & Clerk
Attys.

Patented Mar. 30, 1926.

1,578,741

UNITED STATES PATENT OFFICE.

SYDNEY WALTER LACK AND ARTHUR JAMES SHEPHERD, OF WOOLLAHRA, NEAR SYDNEY, NEW SOUTH WALES, AUSTRALIA.

VESSEL FOR HEATING LIQUIDS.

Application filed October 3, 1924. Serial No. 741,477.

*To all whom it may concern:*

Be it known that SYDNEY WALTER LACK, a subject of the King of Great Britain and Ireland, and residing at 7 Vernon Street, Woollahra, near Sydney, New South Wales, Commonwealth of Australia, and ARTHUR JAMES SHEPHERD, of 83 Grafton Street, Woollahra, aforesaid, a subject of the King of Great Britain and Ireland, have invented certain new and useful Improvements in and Relating to Vessels for Heating Liquids, of which the following is a specification.

This invention relates to means adapted to allow rapid heating of liquids in vessels or utensils by the direct application of the flame, or heated gases resulting therefrom, to the bottom thereof, said flame or gases being hereinafter designated "heat."

In this specification the term "vessel" is to be understood to mean any vessel whether a saucepan, kettle, copper, urn, boiler, water-heater or otherwise to which the invention may be usefully applied.

The main feature of the invention consists in providing means on the external face of the bottom of the vessel, such means comprising a multiplicity of metal heat conduction vanes spaced from each other and disposed perpendicular to or approximately perpendicular to said bottom, the said vanes being arranged in series of intersecting rows whereby one series of the vanes will be at approximately right angles to the other series thereof. The said vanes are relatively disposed to each other in such manner that the heat impinging against the bottom of the vessel and radially deflected thereby is caused to impinge against the vanes of one series thereof, from whence it is deflected and impinges against vanes of the other series, and is similarly deflected from the latter to the next adjacent vanes and so on until it escapes beyond the area covered by said vanes by tortuous passages provided between the vanes. The fact that the heat impinges from one series of the vanes to the other thereof conduces to obtaining the greatest heat efficiency results, the vanes receiving the heat which, by conduction, is rapidly communicated to the bottom of the vessel and to the contents of the latter. By the application of the invention an increase of heat efficiency of from 35 to 50 per cent is obtained over that of vessels heated in the ordinary way.

Said vanes may be plain or they may be corrugated vertically or horizontally; their contour may be either straight, curved or angular. The vanes nearest the centre of the area on which the heat directly impinges, may if required, be thicker but smaller and less widely spaced apart than those remote from said centre; while, where the velocity and intensity of the heat is less, that is towards the boundaries of the area covered by the vanes, the latter may be thinner, wider, and of greater depth. In certain cases a combination of plain vanes or corrugated vanes of selected contour may be used. The vanes may be affixed to the vessel by any suitable method such as brazing, soldering or welding, or they may be cast integrally with the bottom thereof; and in order that the required draft may not be unduly obstructed, the vanes may be perforated though this feature is not considered necessary.

Another feature of the invention includes the provision of an apertured shroud or skirt extending downwardly from the vertical wall of the vessel and surrounding the vanes; such shroud or skirt may constitute an annular base for the support of the vessel, whereby the weight of same is not borne by the vanes. Said shroud, skirt or base may also act as a conductor of heat to the vertical wall and bottom of the vessel. Apertures in said shroud or skirt serve to permit ready passage of heat through the tortuous passages between the vanes without choking or damping thereof.

Figure 2:
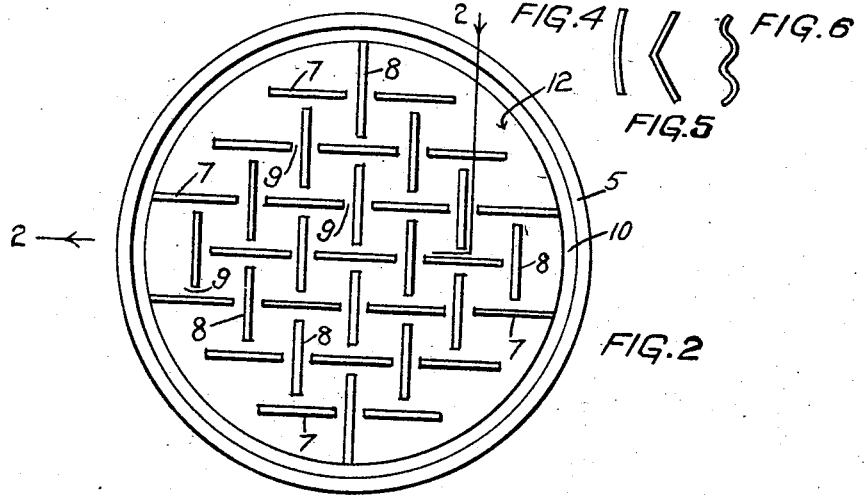
Figure 3:
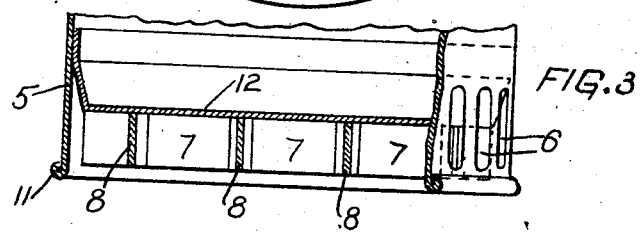

With a view to illustrating the invention one embodiment thereof as applied to a kettle is shown in the accompanying drawings, in which Fig. 1 is a perspective view of a kettle; Fig. 2 a bottom plan view thereof; Fig. 3 a broken sectional detail view of the bottom of a kettle on line 2—2 Fig. 2; Figs. 4, 5, and 6 respectively detail views of curved, angular and corrugated vanes; and Fig. 7 a broken sectional detail view of the bottom of a kettle with heat conduction vanes arranged thereon in a modified manner to that shown in Fig. 3.

Referring to Figs. 1 to 3, the body 1, spout 2, handle 3 and lid 4 of the kettle may be of any usual construction; the body 1 is, however, provided with a downwardly extending skirt or shroud 5 furnished with a series of openings 6. The said skirt covers the series of vanes which are disposed on the bottom 12 of the kettle. Such vanes as shown in Figs. 1 to 3 are plane surfaced and are of the same thickness and superficial area. They are arranged perpendicularly on the bottom of the kettle in series of intersecting rows, one series thereof 7 being disposed at right angles to the other series 8 with intervening spaces or passages 9 between the separate vanes, and a border passage 10 surrounding the whole of the vanes. The foot of the skirt 5 may be formed with a rolled edge 11.

Figure 7:
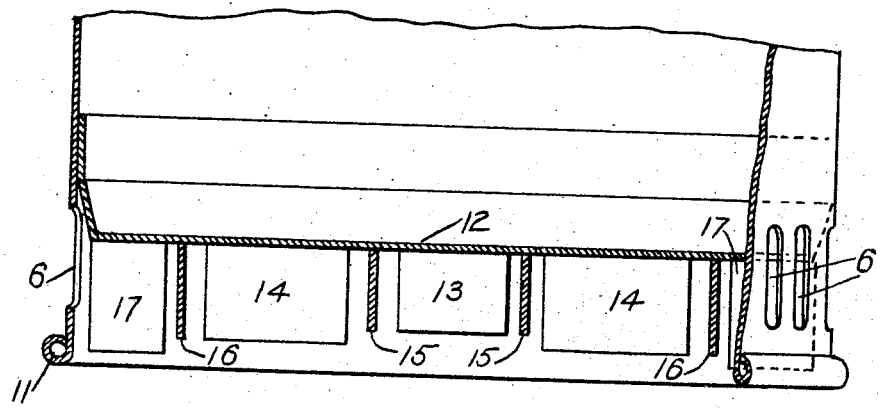

In Fig. 7 a modified arrangement of the vanes 7 and 8 is shown on the bottom 12 of the kettle. Certain of such vanes 13 and 15 are of smaller length and width than the other vanes 14, 16 and 17, the latter being disposed outwardly from the centre of the bottom 12 of the kettle, and the former being disposed at and about such centre. The vanes so shown are plane surfaced, and disposed perpendicularly to the bottom 12 of the kettle. One of the vanes 15 is shown closer to the vanes 13 than the other vanes 15 to the vanes 14 and 16 and the vanes 16 are shown closer to the vanes 17 than to the vanes 14.

Instead of the vanes being made straight as shown in Figs. 1 to 3 and 7, they may be curved as shown in Fig. 4, or angular as shown in Fig. 5, or corrugated as shown in Fig. 6.

What we claim as our invention and desire to secure by Letters Patent is:—

1. A vessel wherein liquid is to be heated, having on the exterior face of the bottom thereof, a plurality of metal heat conduction vanes arranged in two intersecting series of parallel rows, each row of one series being intersected between its vanes by the adjacent vanes of alternate rows of the other series; passages being formed between adjacent vanes.

2. In a vessel wherein liquid is to be heated, the combination with the bottom of the vessel of a plurality of metal heat conduction vanes, said vanes being disposed externally and approximately perpendicular to the face of the said bottom and arranged in two intersecting series of rows, each row of one series being intersected between its vanes at approximately right angles by the adjacent vanes of alternate rows of the other series, passages being provided between adjacent vanes.

3. In a vessel wherein liquid is to be heated, the combination with the outer face of the bottom of the vessel of a plurality of metal heat conduction vanes, said vanes being spaced from each other and disposed perpendicular to said face and arranged in two intersecting series of rows, whereby each row of one series will be intersected between its vanes by the adjacent vanes of alternate rows of the other series, and whereby also a series of tortuous passages for heat will be provided between adjacent vanes and heat from the adjacent vanes of one series will be caused to impinge on the adjacent vanes of the other series.

In testimony whereof we affix our signatures.

SYDNEY WALTER LACK.
ARTHUR JAMES SHEPHERD.